UNITED STATES PATENT OFFICE.

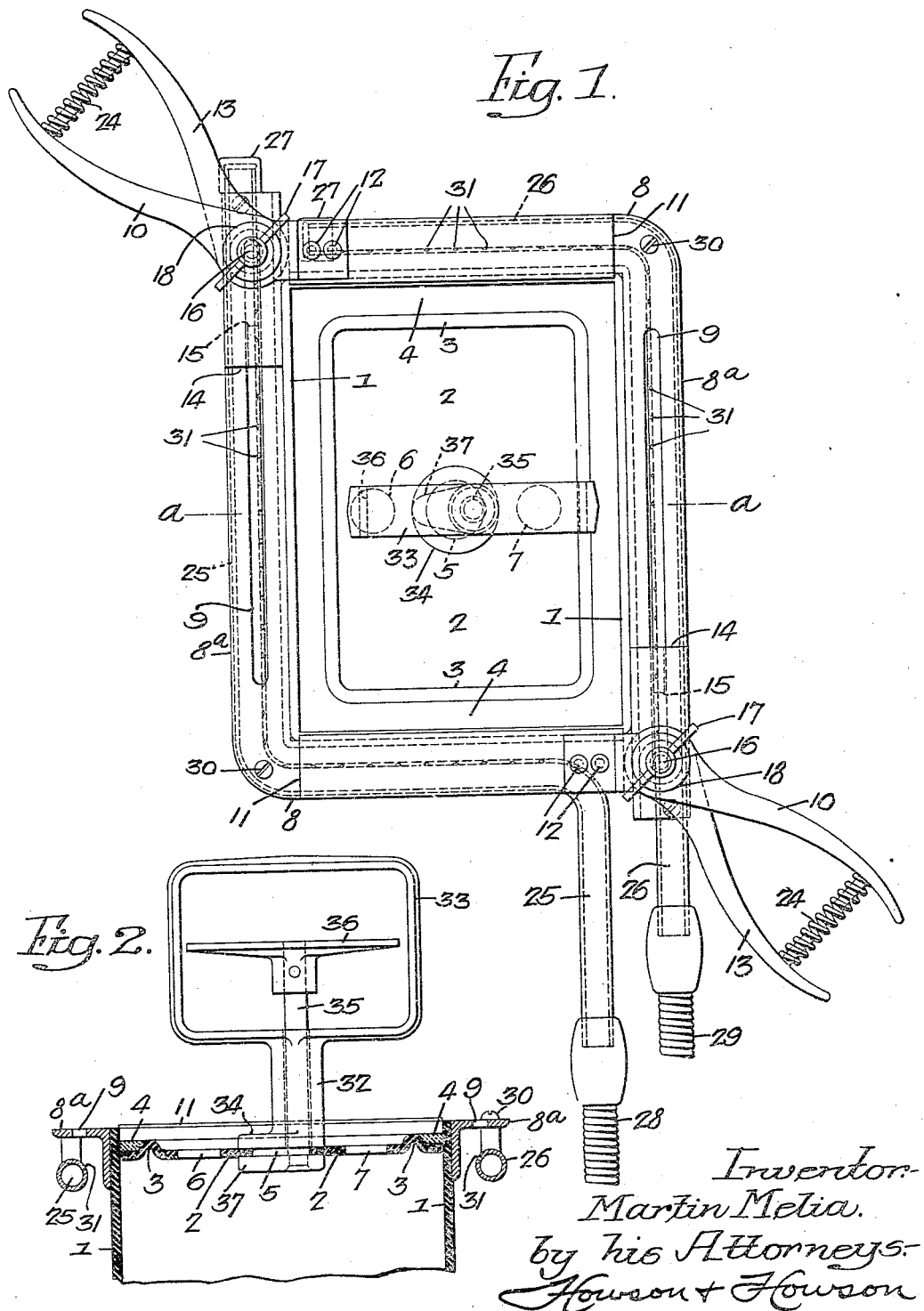

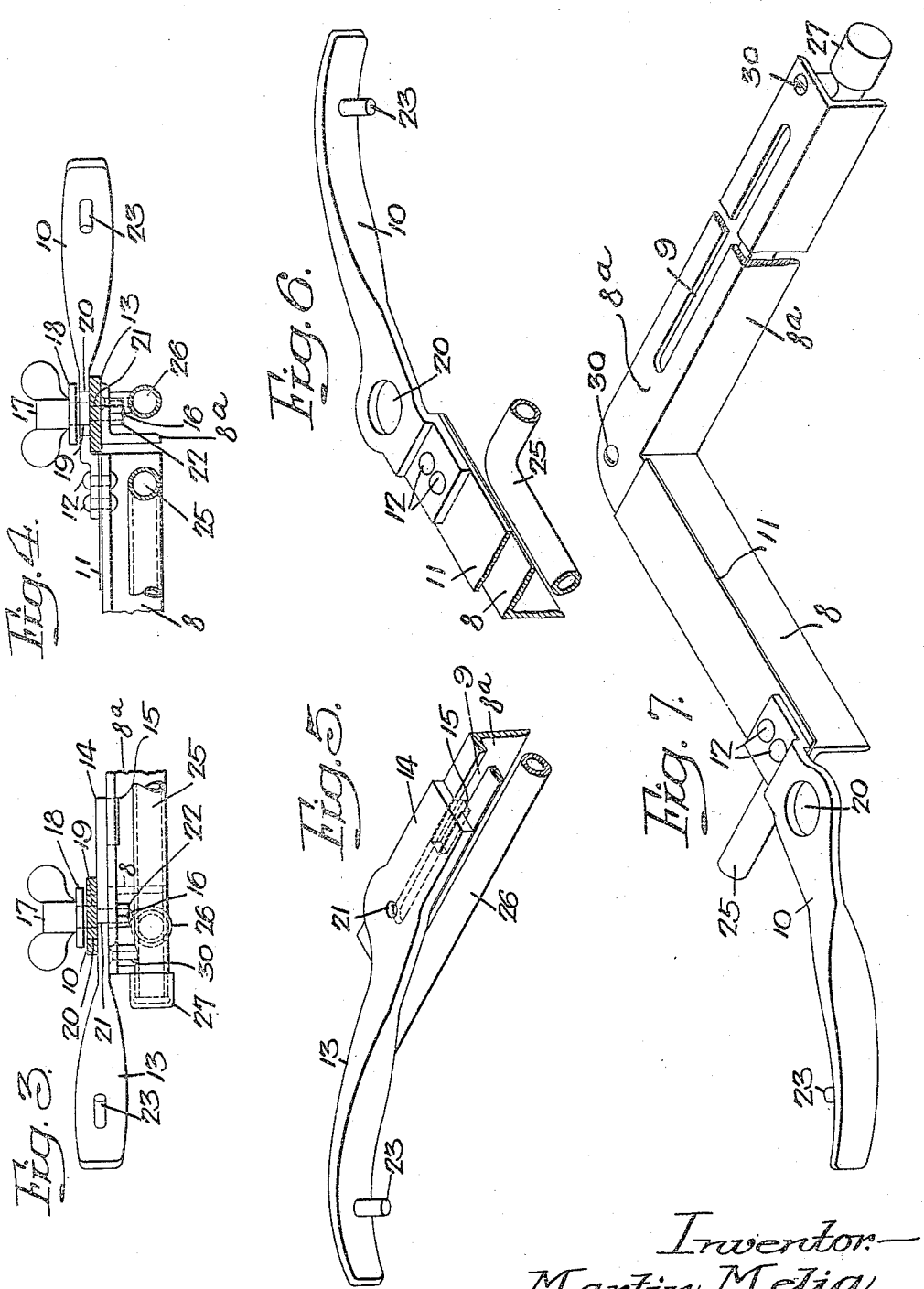

MARTIN MELIA, OF PHILADELPHIA, PENNSYLVANIA, ASSIGNOR TO COMMERCIAL TRUCK COMPANY OF AMERICA, OF PHILADELPHIA, PENNSYLVANIA, A CORPORATION OF PENNSYLVANIA.

BATTERY-COVER-REMOVING DEVICE.

1,243,539.     Specification of Letters Patent.     Patented Oct. 16, 1917.

Application filed July 1, 1915. Serial No. 37,616.

*To all whom it may concern:*

Be it known that I, MARTIN MELIA, a citizen of the United States, residing in Philadelphia, Pennsylvania, have invented Battery-Cover-Removing Devices, of which the following is a specification.

At the present time it is customary to provide storage battery cells, particularly those of the type employed for the propulsion of vehicles, with hard rubber covers sealed in a position slightly below the top edge of the container by a body of fusible compound, which it is necessary to remove before access may be had to the interior of the cell either for washing the same or for removing the elements. Hitherto it has been necessary to cut or chisel out this body of compound when it was desired to remove the cover, and this operation not only required considerable time and labor, but frequently resulted in injury either to the cover or to the cell.

One object of my invention therefore is to provide a device whereby it shall be possible to quickly and conveniently remove sealed battery cell covers, said invention contemplating means for simultaneously heating the sealing compound for its entire length so as to soften it sufficiently to permit of the withdrawal of the cover.

A further object of the invention is to provide a novel device for simultaneously applying heat to the four sides of a battery jar for the purpose of softening the ring of compound employed to seal the jar cover in position, the arrangement of parts being such as to permit of the device being quickly applied to and adjusted on cells of different sizes.

Another object of my invention is to provide a novel device for gripping and forcibly removing the rubber or other plates forming the covers of storage battery cells, which shall be of such construction as to permit of the application of considerable power without danger of breaking the cover.

I also desire to provide a novel structure for applying heat to the substantially vertical walls or sides of a battery cell, which while being capable of a relatively coarse adjustment to fit it for application to cells of widely varying widths, shall also include a device whereby it may be adjusted to compensate for small variations in the dimensions of the cells which are nominally of the same size.

These objects and other advantageous ends I secure as hereinafter set forth, reference being had to the accompanying drawings, in which, Figure 1 is a plan illustrating my device as applied to a battery cell;

Fig. 2 is a section on the line *a—a*, Fig. 1 further illustrating the invention;

Figs. 3 and 4 are fragmentary elevations partly in section illustrating the detail construction of the lifting and operating handles with the parts immediately associated therewith;

Figs. 5 and 6 are perspective views of the structures shown in Figs. 3 and 4 respectively; and Fig. 7 is a perspective view on a reduced scale of one of the parts constituting the angle iron frame of my device.

In the above drawings 1 represents the upper portion of a battery cell commonly made of hard rubber or the like, provided with a cover 2 in the shape of a flat plate also of hard rubber having adjacent and parallel with its periphery an upwardly projecting rib 3 between which and the upper part of the inside surface of the cell is a body 4 of sealing compound, making a liquid-tight joint both with the battery cell and with the rib and peripheral portion of the cover 2. The latter customarily has three holes 5, 6, and 7 formed in it, of which the first is substantially central, and the other two are on opposite sides of the first hole with their centers on the transverse diameter of the cover.

My invention includes two lengths of angle iron each bent so that one part 8ª is at right angles to the other part 8 and has in its upper surface an elongated slot 9. The part 8 has riveted to its extremity a handle member 10 preferably of the form commonly used in pliers, pincers or the like, there being also an elongated plate 11 mounted between the end of this handle and the top surface of the angle frame member 8 so as to be held in engagement therewith by the rivets 12, with one of its edges extending beyond or overhanging the adjacent vertical face of said frame member.

Coacting with each of the handle members 10 is a second handle member 13 of a generally similar shape except that its inner end is prolonged in the form of a short flat plate 14 having a longitudinally extending key 15 projecting from its lower face into the slot 9 of the frame member 8ᵃ belonging to the second one of the handle members 10. The members 10 and 13 of each pair are pivotally connected by a bolt 16 having a winged head 17 operative upon a washer 18 which in turn engages the top surface of the handle member 10. Moreover this bolt has an enlarged portion 19 which loosely passes through a pivot hole 20 in said handle member of considerably larger diameter and closely fits the pivot opening 21 of the second handle member 13, its lower end being provided with a nut 22. The handle members of each pair are provided with studs 23 projecting toward each other from their outer ends, designed for the reception of a spring 24 which normally acts to force said ends apart.

Obviously by loosening the bolt 16, the end members 8 of each of the angle frame parts may be drawn apart to increase the length of the rectangle defined by them and these are so arranged that when the device as a whole lies in a horizontal plane the frame members each present two vertical surfaces at right angles to each other for engagement with the vertical sides of a battery cell. For heating these vertical faces of the frame members I provide a gas burner shown in the present case as consisting of two sections 25 and 26 of gas pipe, though obviously other forms of heating means may be employed without departing from my invention.

The first of these pipes extends around the two sides of one of the frame members 8—8ᵃ within the angular space defined by its top and side members, while the second gas pipe 26 extends in the similar space of the second frame member, each of said pipes having a plug or cap 27 at its distant end. These gas pipes may be supported in any desired manner and in the case illustrated I have shown them as carried by screws 30 extending downwardly from the top webs of the frame members. The gas pipes are provided with outlet openings 31 directed toward the vertical webs of the various frame members so that the gas jets issuing therefrom will directly heat the same.

Under conditions of operation the bolts 16 are loosened and the frame is approximately fitted to the top portion of a battery cell 1 by adjusting the parts 8 of the frame members toward or from each other, at which time the keys 15 as well as the bolts 16 slide in the slots 9, it being understood that each frame is designed to operate on battery cells of substantially constant width but of widely varying lengths. After this adjustment has been made, the bolts 16 are tightened by turning their winged heads 17 and then by squeezing together the handle members 10 and 13 of each pair against the action of the springs 24, the frame as a whole may be made to increase its area owing to the lateral movement of the part 19 of each of the bolts in the enlarged openings 20 of the handle members 10.

When in this condition the frame may be easily applied to the upper end of a battery cell, and upon release of the handles, the action of the springs causes the frame members to approach each other so that their vertical faces will lie in close engagement with the vertical sides of the battery cell while the device is held in place by the overhanging edge of the plates 11 resting upon the top edges of the battery cell. If gas be supplied to the pipes 25 and 26 and ignited, it will issue from the openings 31, thus heating the frame members, and particularly their vertical faces, to a high temperature, though not sufficiently to injure the rubber of the battery cells to which they are applied.

Owing to the comparatively close engagement of these frame members with the walls of the battery cell immediately opposite the lines of engagement of the sealing compound 4 therewith, this latter is very shortly softened by the heat transmitted through the walls of the cell so that a comparatively slight upward force exerted on the cover plate 2 suffices to remove it with the compound. Merely by grasping the handles with sufficient force to slightly separate the two frame members, the device may be removed from the battery cell and quickly placed upon another.

In order to facilitate the removal of the cover plates, I provide a lifting device particularly designed to effect this result without liability of injury to them and for this I employ a handle consisting of a tubular stem 32 which at one end has integral with it a hand grip 33 and at its other end is laterally extended to provide a circular foot 34. Within said body 32 I place a longitudinally movable rod 35 having pinned on its upper end a finger bar 36 and at its lower end having a head 37 laterally elongated in one direction.

In employing this for the removal of the cover plate of a battery cell the grip 33 is engaged by the hand of the operator, thus allowing the finger bar 36 to drop under the action of gravity to the lower portion of said member, and permitting the head 37 to project some distance below the foot 34. Said head is preferably made greater in length than the diameter of the central hole 5 of the cover, being entered in said hole in an inclined position, and thereafter brought into such a position that it engages the edges of the opening at diametrically opposite points for a considerable area.

By drawing up on the finger bar 36 within the hand grip 33, the foot 34 is caused to engage the upper surface of the cover plate around the hole 5 while the head 37 engages the under surface, so that an upward force may be exerted on said plate, which when the compound 4 is softened as above described, permits of its easy removal. Should said compound be insufficiently softened so that it is necessary to exert considerable force in withdrawing the cover, the liability of breakage of the latter will be reduced to a minimum owing to the relatively large area engaged by the head 37 and foot 34.

I claim:—

1. The combination of a frame consisting of two members each bent at right angles; with means movably connecting said members at their ends to define a substantially rectangular figure, the same consisting of two handles each pivoted to one of the members and adjustably connected to the other member.

2. The combination of a frame consisting of two members each bent at right angles; means movably connecting said members at their ends to define a substantially rectangular figure; and two sets of coacting handles respectively connected to said frame members adjacent their points of connection.

3. The combination of a frame consisting of two members each bent at right angles, with the ends of one member adjustably connected to those of the other member; means for rigidly retaining said two sets of connected ends in any adjusted positions to cause said frame members to define any of a number of open rectangular figures of different dimensions; and two sets of handles of which those of each set are pivoted together.

4. The combination of a substantially rectangular frame consisting of two members; means for pivotally connecting said members at diametrically opposite points; and means permitting limited longitudinal adjustment of the frame members.

5. The combination of a frame consisting of two members each of substantially right-angular form and each including a longitudinally adjustable end section; with means for pivotally connecting said adjustable portion of each member to the body of the other member.

6. The combination of a frame consisting of two members each of substantially right-angular form and each including a longitudinally adjustable end section; means for pivotally connecting said adjustable portion of each member to the body of the other member; and two pairs of handles for moving said members on their pivotal connecting means.

7. The combination of two members longitudinally slidable relatively to each other; a hand grip for each of said members at one end of each thereof; and laterally projecting coacting jaws at the opposite ends of said members respectively.

8. The combination of a tubular stem having an open gripping frame at one end; a rod slidably mounted in said stem and having a cross member forming a hand grip operative within said frame; with coacting jaws respectively projecting from said stem and said rod and extending substantially parallel to each other.

MARTIN MELIA.

Copies of this patent may be obtained for five cents each, by addressing the "Commissioner of Patents, Washington, D. C."